Aug. 7, 1951 C. H. SCOTT 2,563,622
HYDRAULIC DRIVE
Filed Jan. 23, 1948 6 Sheets-Sheet 1

INVENTOR:
CHARLES H. SCOTT,
BY
Arthur Middleton
ATTORNEY

Aug. 7, 1951  C. H. SCOTT  2,563,622
HYDRAULIC DRIVE
Filed Jan. 23, 1948  6 Sheets-Sheet 2
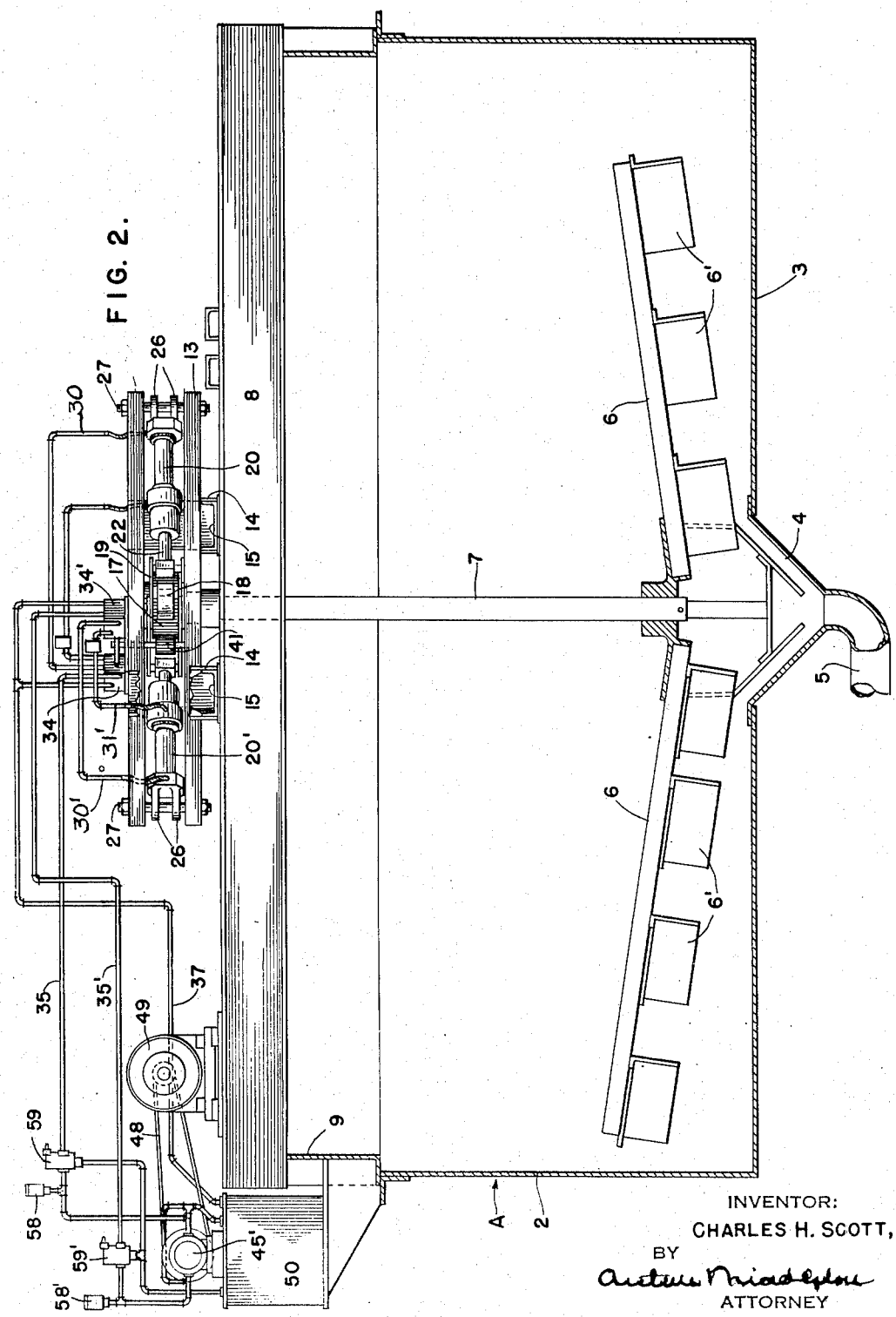
INVENTOR:
CHARLES H. SCOTT,
BY
Arthur Middleton
ATTORNEY Aug. 7, 1951
C. H. SCOTT
2,563,622
HYDRAULIC DRIVE
Filed Jan. 23, 1948
6 Sheets-Sheet 3
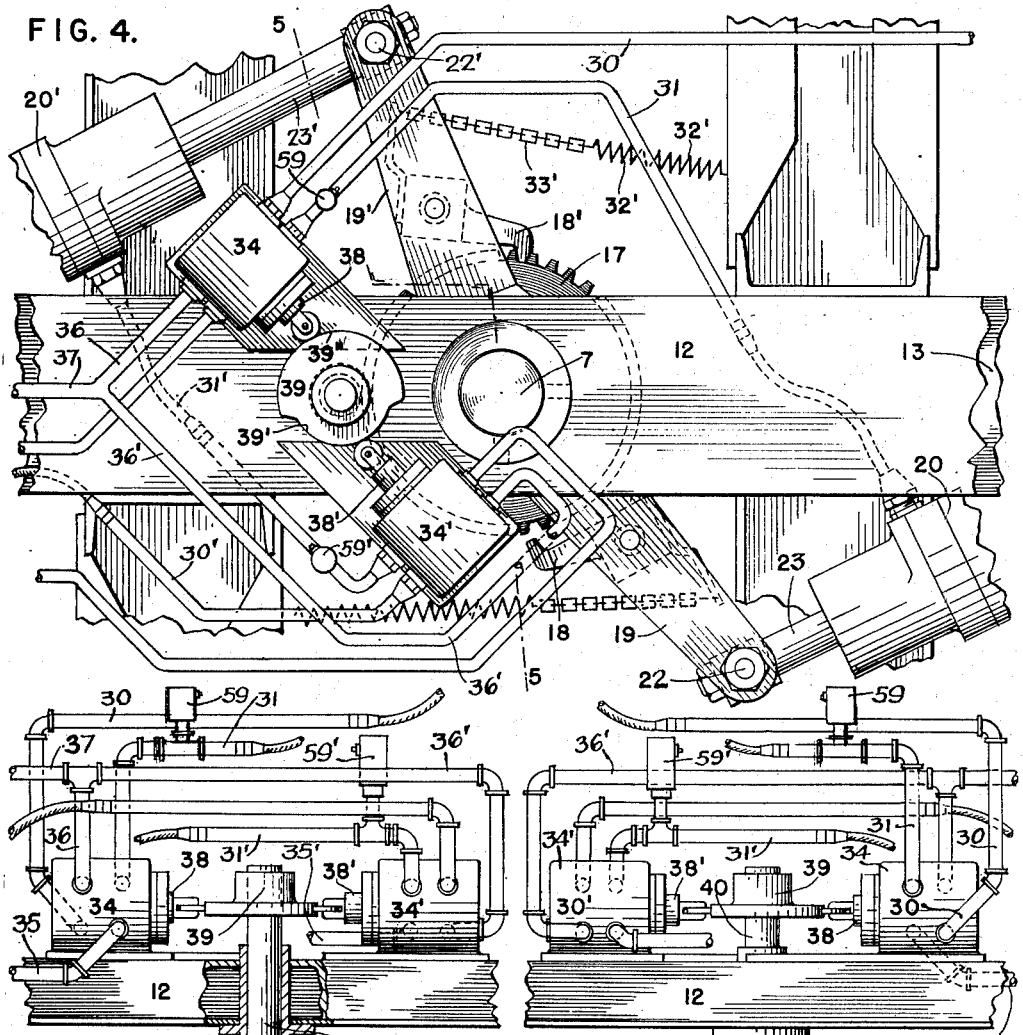
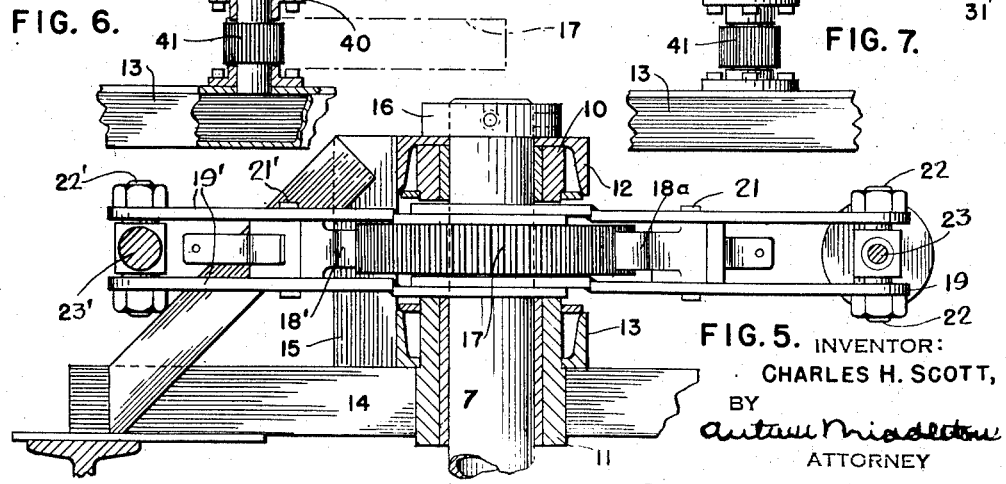
INVENTOR:
CHARLES H. SCOTT,
BY
Arthur Middleton
ATTORNEY

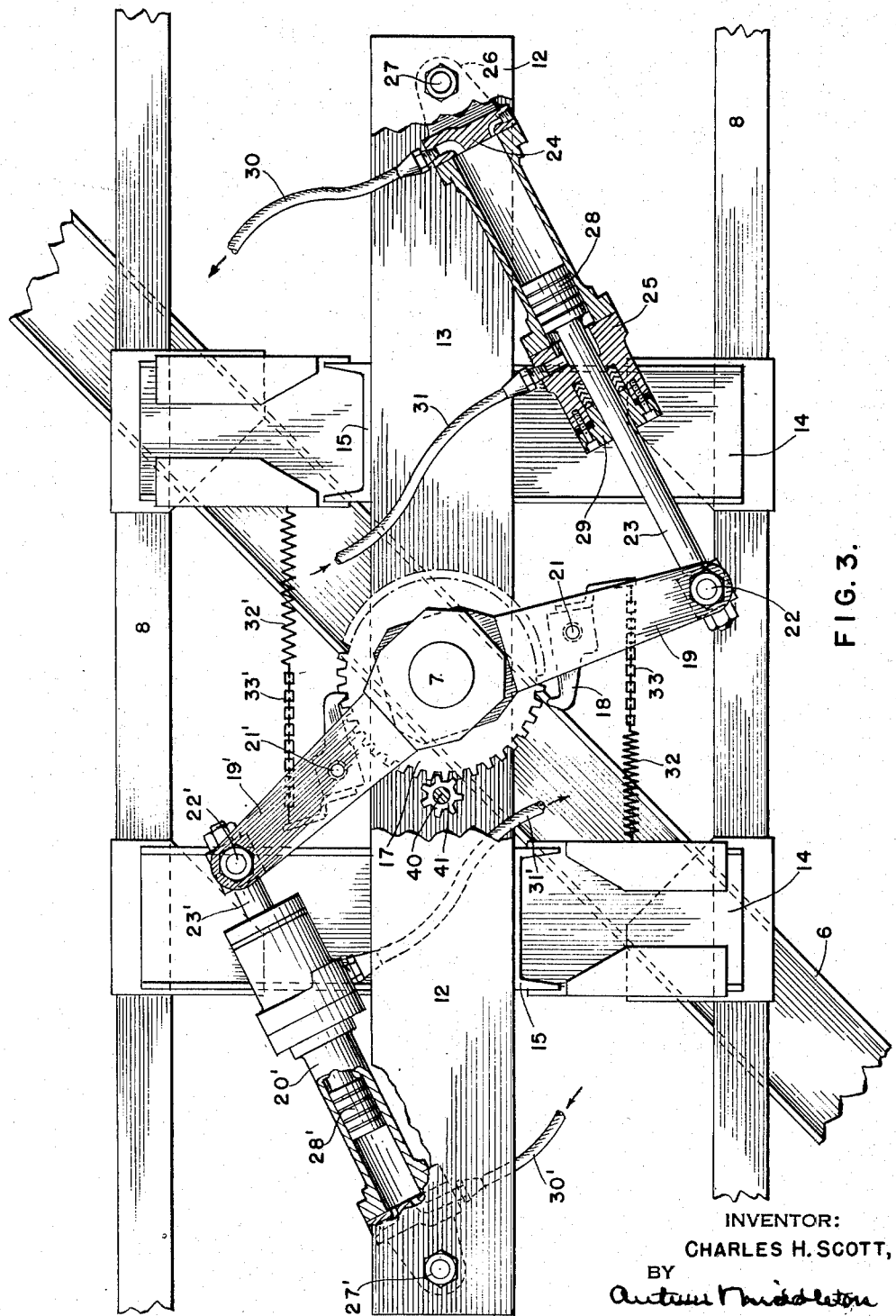

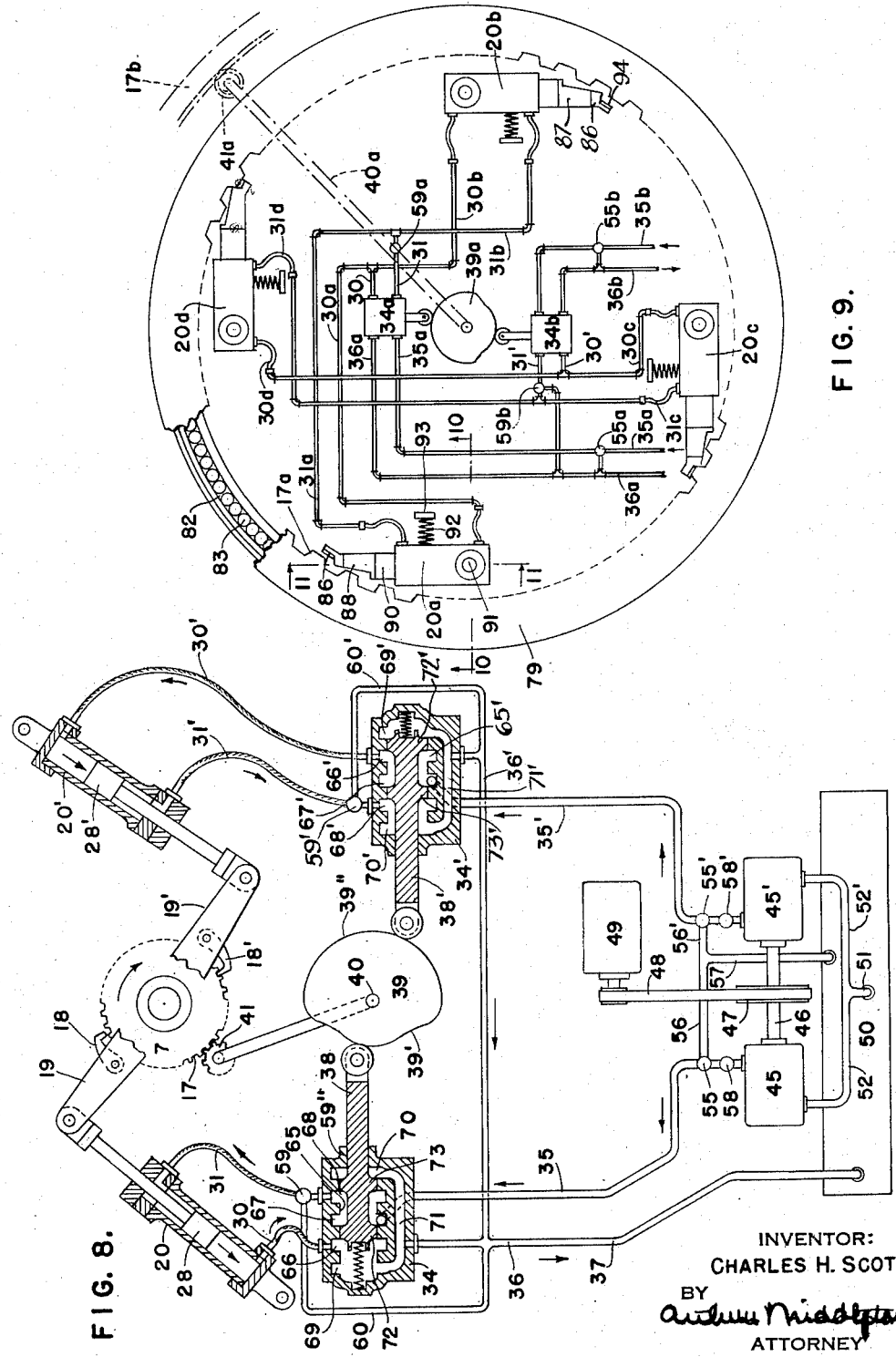

Aug. 7, 1951 C. H. SCOTT 2,563,622
HYDRAULIC DRIVE
Filed Jan. 23, 1948 6 Sheets-Sheet 6

INVENTOR:
CHARLES H. SCOTT,
BY
ATTORNEY

Patented Aug. 7, 1951

2,563,622

UNITED STATES PATENT OFFICE 2,563,622

HYDRAULIC DRIVE

Charles Harold Scott, Westport, Conn., assignor to The Dorr Company, Stamford, Conn., a corporation of Delaware Application January 23, 1948, Serial No. 4,042

6 Claims. (Cl. 210—55)

The general object of the present invention is to provide a simple and effective hydraulic drive mechanism of novel form for rotating a structure about an axis at a relatively low angular velocity but against a relatively strong opposing force or load torque.

The invention was primarily devised for use in rotating the mud rakes of large sedimentation units used for thickening and desilting purposes. The large sedimentation units with which the present invention may be used with special advantage, have diameters varying from about one hundred feet up to about two hundred fifty or more feet. Each such unit is usually provided with a central bottom outlet for the discharge of solids or mud deposited on the bottom wall of the sedimentation chamber or basin and slowly worked to the central outlet by mud rakes forming part of a structure mounted for rotation about the central vertical axis of the sedimentation chamber. While the rotative movement of the mud rakes is quite slow, the substantial radial extent of the mud rake arms, and the mud density and volume are such that a large driving torque must be impressed on the rotating structure to maintain it in rotation at a suitable speed. Heretofore, it has been customary to rotate the mud rakes of large sedimentation devices by an electric motor connected to the rotating structure through speed reducing toothed gearing of a relatively heavy and expensive type.

A primary object of the invention is to provide a mechanism comprising pistons working in hydraulic cylinders and pawl and ratchet means through which said pistons impress continuous rotative forces on a rotatable structure, and sufficiently simple, reliable and effective and relatively inexpensive to construct and operate so that it may be used with advantage in place of a driving mechanism including speed reducing gearing of the type heretofore customarily employed.

A specific object of the invention is to provide a hydraulic driving mechanism in which each pawl actuating cylinder is pivoted at one end to the supporting structure so that the stem or connecting rod rigidly connected to the piston working in said cylinder may be directly connected to the actuating pawl of the pawl and ratchet mechanism in one form of the invention, and in another form of the invention may be directly connected to the free end of a ratchet lever pivoted to turn about the axis of the rotating structure.

The present invention is well adapted for use with the rotating structure and rotating mechanism of a relatively large sedimentation unit, supported in either of the two ways heretofore customary, namely, either by means of a supporting structure comprising a bridge or beam above the sedimentation chamber and extending diametrically across the latter and supported at its ends, or by means of a vertical center pier or column extending up through the sedimentation space to a height suitably above said space. By way of example and illustration, it is noted that the bridge type supporting means for the rotating structure of a large sedimentation unit is shown in my prior Patent 2,087,725 of July 20, 1937, and that support of the rotating structure and rotating mechanism of a large sedimentation device by a center pier or column, is disclosed in my prior Patent 2,086,394 of July 6, 1937.

One specific object of the invention is to provide a mechanically simple hydraulic drive of the pawl and ratchet type characterized by the simple and effective character of the valve mechanism by which a small number of pawls, usually not more than two, each with an individual hydraulic actuating cylinder, are employed to maintain the rotating structure of the sedimentation device in slow but continuous rotation.

Another specific object of the invention is to provide simple and effective means, comprising pressure relief valves, for limiting the maximum fluid pressures transmited to the hydraulic cylinders to prevent injury to the apparatus when the resistance to the piston movement becomes unduly high.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Fig. 2 is an elevation in section on the line 2—2 of Fig. 1;

Fig. 3 is a plan view on a larger scale of a portion of the apparatus shown in Fig. 1, with parts broken away and in section;

Fig. 4 is a plan view on a still larger scale of a portion of the apparatus shown in Figs. 1 and 3 with parts broken away;

Fig. 5 is an elevation with parts in section on the line 5—5 of Fig. 4;

Fig. 6 is an elevation partly in section of valves and valve operating mechanism shown in Figs. 1 and 4 as seen from one side;

Fig. 7 is an elevation of the apparatus shown in Fig. 6 as seen from its other side;

Fig. 8 is an operation diagram illustrating the operation of the apparatus shown in Figs. 1–7;

Fig. 9 is a somewhat diagrammatic plan view illustrating a modification of the apparatus shown in Figs. 1–8;

Figure 1:
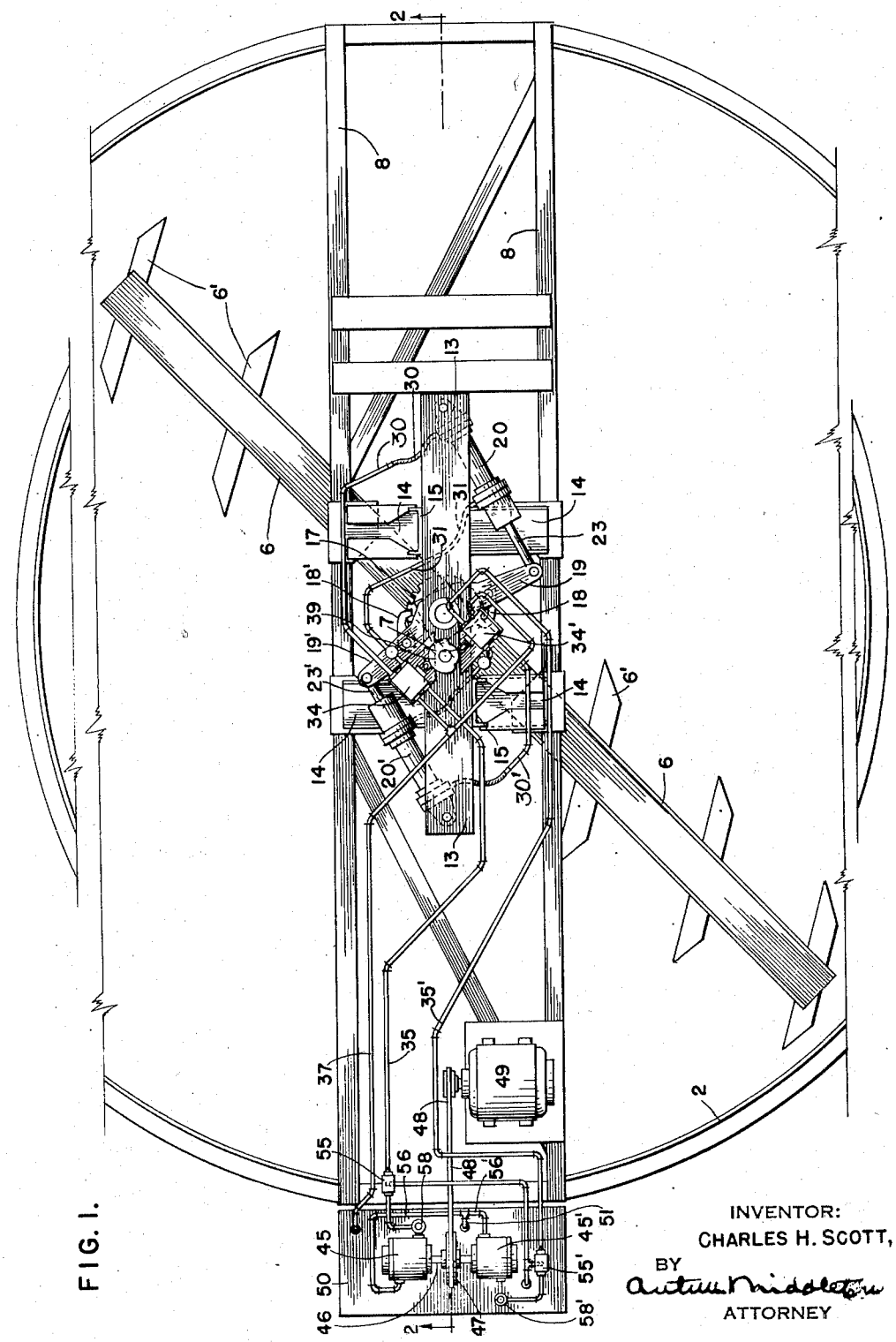
Fig. 1 is a plan view of a sedimentation unit with parts broken away.

In the embodiment of the invention illustrated by way of example in Figs. 1–8 of the accompanying drawings, 1 represents a cylindrical sedimentation or thickening chamber or basin which is shown as surrounded by the cylindrical wall 2 of a vertically disposed tank. The latter is open at its upper end and has a bottom wall 3 formed with a central conical depression 4 which serves as a mud outlet to which is connected a mud pipe 5 through which settled solids are withdrawn. Mud pumping means (not shown), of the usual type may be used to draw the mud away from the chamber 1 through the pipe 4. The solids accumulating in the lower portion of the chamber or basin 1, are worked to the mud outlet 4 by rake arms 6 carrying rakes 6' which may be of customary form. The rakes 6 have their inner ends secured to and are supported by a rotating element shown as a vertical shaft 7 coaxial with the chamber 1.

The shaft 7 is suspended from a stationary framework above the chamber or basin 1 which, as shown, comprises a bridge or composite frame structure including a pair of parallel beams 8 which extend across the tank and are supported at their ends by a stationary framework 9. The beams 8 also support the mechanism for rotating the shaft 7. The shaft 7 has its upper end portion journalled in upper and lower sleeve bearings 10 and 11, which are respectively mounted on and supported by upper and lower channel bar beams 12 and 13. Those beams are parallel to, above, and centrally disposed in the space between, the main supporting beams 8. The beams 12 and 13 are supported by a framework which includes bottom beams 14 transverse to and directly supported by the beams 8, and vertical beams 15. The weight of the shaft 7 and rake arms 6 is supported by a thrust bearing, shown as comprising a collar 16 pinned or otherwise secured to the upper end of the shaft 7, and having its underside in engagement with the upper side of the web or body portion of the beam 12, which has downwardly extending side flanges. The beams 12 and 13 are formed with central apertures through which the shaft 7 extends. In lieu of the simple thrust bearing shown in Fig. 7, use will ordinarily be made, particularly in relatively large sediment units, of a thrust bearing including roller elements which may be of the general character of those shown in my above-mentioned prior patents. The above-mentioned structural elements 1—16 are conventional in form and arrangement, and comprise nothing claimed as novel herein.

In the form of the invention illustrated in Figs. 1–8, the rotating structure comprising the mud rakes 6 and shaft 7 is rotated by a hydraulic motor drive mechanism, including a ratchet wheel 17 rigidly attached to and forming a part of the rotating structure, driving pawls 18 and 18' carried by ratchet levers 19 and 19', and hydraulic cylinders 20 and 20'. As shown, the ratchet wheel 17 is in the form of a spur gear and is mounted on and secured to the shaft 7 and is located in the space between the upper and lower beams 12 and 13. The wheel 17 is adapted to be operatively engaged by the pawl 18 during periods which alternate with, and preferably overlap periods during which the wheel 17 is operatively engaged by the pawl 18'. The pawl 18 is mounted on a pivot 21 having its ends secured in upper and lower portions of the lever 19. The lever 19 has one end journalled on the shaft 7 and has its opposite end connected through a pivot 22 to the piston 23 of the hydraulic cylinder 20. The cylinder 20 has end members or heads 24 and 25. The end member 24 has an extension, shown in Fig. 2 as comprising two spaced apart ears 26 perforated to receive a transverse pivot pin 27 which pivotally connects the corresponding end of the cylinder 20 to the upper and lower beams 12 and 13. The end member 25 is formed with an axial passage for the piston rod 23 which is secured to the adjacent end of the piston 28 working in the cylinder 20. A stuffing box 29 is provided at the outer end of the head 25 to prevent leakage out of the cylinder 20 along the piston rod 23. The previously mentioned pawl 18', ratchet lever 19' and cylinder 20' are associated with parts 21' to 29' which may be, and as shown are similar to the previously mentioned parts 21—29, respectively.

The lever 19 is given successive angular movements in the clockwise direction, as seen in Fig. 3, by pressure fluid, ordinarily oil, supplied to the piston chamber in the cylinder 20 through a pipe 30 connected to the pivoted or rear end of the cylinder 20, and is given counter-clockwise movements alternating with the clockwise movements by pressure fluid intermittently supplied to the opposite or front end of the cylinder 20 through a pipe 31. The pipes 30 and 31 include flexible portions to accommodate the oscillating movements of the cylinder 20 about its pivot 22. The lever 19' is given alternating clockwise and counter-clockwise adjustments by pressure fluid intermittently supplied to the rear and front ends, respectively, of the piston chamber in the cylinder 20' by pipes 30' and 31', similar to the pipes 30 and 31. The clockwise and counter-clockwise movements of the levers 19 and 19' are driving and return strokes, respectively. The supply of pressure fluid to, and its discharge from the cylinders 20 and 20' through the pipes 30, 31, 30' and 31' is controlled by a valve mechanism illustrated diagrammatically in Fig. 8, and hereinafter described. In Fig. 8, the piston 28 working in the cylinder 20 and the piston 28' working in the cylinder 20' are shown in the positions through which they respectively move during an intermediate portion of a working stroke of piston 28 and a return stroke of piston 28'.

During each driving or working stroke of either lever 19 or 19', the corresponding pawl 18 or 18' engages the wheel 17, as does the pawl 18' shown in Fig. 3. As the idle stroke of each ratchet lever is initiated, the corresponding pawl is cammed out of engagement with the wheel 17 and is then free to occupy the position relative to the wheel in which the pawl 18 is shown in Fig. 3, until near the end of said idle stroke. In the final portion of the idle stroke of each ratchet lever, the corresponding pawl 18 or 18' is moved into operative engagement with the teeth of the wheel 17, by the corresponding bias spring 32 or 32'. Only as shown, each bias spring has one end connected to the adjacent cross-beam 14 and has its other end connected through a chain 33 or 33' to the tail of the corresponding pawl. The bias springs and associated chains are so proportioned and arranged that each bias spring is put under tension only near the end of the return stroke of the corresponding lever. The tension of each bias spring is relieved after a short initial portion of the working stroke of the corresponding ratchet lever, but during the remainder of that working stroke the corresponding pawl is held in engagement with the corresponding tooth of the wheel 17 by the driving force then being transmitted by the pawl.

The valve mechanism hereinafter described, so varies the flow of pressure fluid through the pipes 30, 31, 30' and 31' that pressure fluid is supplied to the cylinders 20 and 20' through the pipes 30 and 31', respectively, during periods which alternate with periods during which pressure fluid is supplied to the cylinders 20 and 20' through the pipes 31 and 30', respectively. During the periods in which pressure fluid is being supplied to cylinders 20 and 21 through the pipes 30 and 31', pressure fluid is being exhausted from the cylinders 20 and 20' through the pipes 31 and 30'. Similarly, during the periods in which pressure fluid is being supplied to the cylinders 20 and 20' through the pipes 31 and 30', pressure fluid is being exhausted from the cylinders through the pipes 30 and 31', respectively. Since the idle stroke of each of the pistons 28 and 28' is effected by the passage of pressure fluid into the cylinder space surrounding the corresponding piston stem 23 or 23', the volume of the pressure fluid required to effect the return stroke is substantially smaller than the volume of pressure fluid required to effect a working stroke. In consequence the idle stroke of each of the pistons 28 and 28' may be effected in less time than is required for the working stroke of the piston. The unequal speeds with which the working and idle strokes are effected facilitate the use of the desirable mode of operation in which the working stroke of each of the pistons 28 and 28' is initiated before the working stroke of the other piston is completed.

The valve mechanism controlling the operation of the hydraulic cylinders 20 and 21 comprises similar valves 34 and 34' and means through which they are adjusted by, and in synchronism with, the rotative movements of the rotating structure including the shaft 7 and wheel 17. The pipes 30 and 31 through which pressure fluid is transmitted to, and withdrawn from the opposite ends of the pressure cylinder 20, are connected to separate chambers of the valve 34, and the pipes 30' and 31' supplying pressure fluid to, and withdrawing it from the cylinder 20' are connected to separate chambers of the valve 34'. The valve 34 receives fluid under pressure through a supply pipe 35 from a suitable source of fluid under pressure. The valve 34 discharges fluid at a lower pressure through an outlet 36. Similarly, the valve 34' receives pressure fluid from a suitable source through a supply pipe 35' and discharges pressure fluid at a lower pressure through an outlet pipe 36'. The two outlets 36 and 36' are connected to the same exhaust pipe 37. The character and operation of valves 34 and 34' of suitable type and form are illustrated in Fig. 8 and are hereinafter described.

The valve 34 is of the sliding piston type, and comprises a movable valve member or plunger 38 working in the body or casing of the valve 34, and having a stem portion at one end which extends through a valve body passage into engagement with a valve actuating edge cam. The latter is supported and rotated by a shaft 40, as previously explained. The valve 34' may be identical with the valve 34 but is so disposed that the protruding stem portion of its plunger 38' engages the cam 39 at the opposite side of the cam from the plunger 38. As shown, the protruding end of each of the plungers 38 and 38' is provided with an anti-friction roller directly engaging the edge of the cam 39. The plungers 38 and 38' are biased for movement in the direction to increase the extent to which they protrude from the body of the corresponding valve. With the construction shown, the biasing force action on each valve plunger is due to spring pressure.

The extent to which each plunger axially protrudes from the corresponding valve body is fixed and periodically varied by the rotating cam 39. The latter has an edge portion 39' having one radius of curvature and extending circularly about the axis of the shaft 40 for something less than 180°, and a second arc shaped edge portion 39'' having a larger radius of curvature and extending circularly about the axis of the shaft 40 for something more than 180°. The shaft 40 is vertically disposed and has a bearing in each of the beams 12 and 13. Between those beams, the shaft 40 carries a spur gear 41 substantially smaller in diameter than the gear wheel 17 and having teeth in mesh with the teeth of the wheel 17. The gear tooth ratio of the gears 17 and 40 is not critical, but it is noted by way of illustration and example, and not by way of limitation that in one practical design of apparatus of the character illustrated, the wheel 17 has 52 teeth and the gear 40 has 8 teeth. In that design, each rotation of the gear 40 might be effected by one working stroke of the lever 19 and an equal working stroke of the lever 19', with a minimum angular extent of each working stroke of about 27.7°. In practice, however, the angular extent of each individual working stroke is preferably somewhat greater than the minimum possible, so that the successive working strokes may overlap to the end that each working stroke effected by either lever will begin before the last preceding working stroke previously initiated by the other lever is completed. Such overlapping of working strokes insures that in normal operation, no interruption in the rotative movement of the rotating structure will occur at the end of each working stroke of either lever 19 or 19'. The stroke overlapping action results, with the apparatus shown, from the fact that the cam edge 39' is an arc of more than 180° and that each of the valves 34 and 34' supplies pressure fluid to the rear end of one or the other of the cylinders 20 and 20' through the corresponding pipe 30 or 30' during the period in which the corresponding valve member 38 or 38' is in engagement with the cam edge 39''.

Each return or idle stroke of each of the pistons 28 and 28' is effected during the period in which the corresponding valve member 38 or 38' is in engagement with the cam edge arc 39'. That arc extends around the axis of the shaft 40 for something less than 180°, but as previously explained, each of the portions 28 and 28' moves more rapidly during its return stroke than during its working stroke. In the apparatus shown, each idle stroke is completed before the rotation of the cam terminates the engagement of the cam edge 39' with the plunger of the valve supplying the pressure fluid effecting the idle stroke. During the period between the end of an idle stroke and the beginning of the following working stroke, the corresponding piston 38 or 38' stalls against the rear end of the corresponding piston chamber.

The pressure fluid supply pipes 35 and 35' are connected to the respective outlets of two similar constantly operating pumps 45 and 45', so that the two supply pipes are continuously receiving pressure fluid from similar sources of such fluid. As shown, the pumps are rotary pumps of the displacement type, and have a common driving shaft 46. The latter carries a pulley 47 rotated by a belt 48 which runs over the pulley 47 and over the driving pulley of an electric motor 49, the latter normally operating at a predetermined speed. The pumps 45 and 45' draw oil or other pressure fluid from an oil tank or reservoir 50 through a suction pipe 51 which normally includes a filter (not shown). The pipe 51 is connected to the inlet of the pump 45 by a branch pipe 52, and is connected to the inlet of the pump 45' by a branch pipe 52'. The return pipe 37 discharges into the tank 50.

An important feature of the present invention is found in its provision for preventing injury to the apparatus as a result of an overly large increase in the resistance to rotation of the structure rotated through the ratchet wheel 17. Such an increase may result from an increase in the density of mud engaged by the rake arm scrapers 6', or from an increase in the amount of mud which has accumulated on the settling chamber floor and increases the load on the motor and tends to increase the pressures in the pipes 35 and 35', and tends to slow down the pumps and their driving motor 49. In the preferred form of the present invention, the extent of permitted increase in pressure transmitted by the pipes 35 and 35' to the valves 34 and 34', respectively, is limited to a predetermined maximum by the inclusion of pressure relief valves 55 and 55' in the pipes 35 and 35', respectively. Those valves are arranged to open and discharge pressure fluid when the pressure therein attains the predetermined maximum desired. As shown, the oil or other pressure fluid then discharged from the pipes 35 and 35' by the relief valves 55 and 55' is returned to the reservoir 50 through separate outlet pipes 56 and 56', respectively, and through a common return pipe 57 to which each of the pipe outlets 56 and 56' is connected. Advantageously, and as shown, a pressure gauge 58 is connected to the portion of the pipe 35 between the outlet of the pump 45 and the relief valve 55, and a similar pressure gauge 58' is connected to the pipe 35' between the pump 45' and the relief valve 55'.

Additional protection against undesirable operating conditions is obtained by pressure relief valves 59 and 59' included in the pipes 31 and 31' supplying pressure fluid to the cylinders 20 and 20', to effect the return strokes of pistons 28 and 28'. Each of the valves 59 and 59' is adapted to open on the pressure increase in the corresponding pipe 31 or 31' when the return movement of the associated piston 28 or 28' is interrupted by its engagement with the front end wall of the chamber in which it works. The pressure fluid discharged by valves 59 and 59' is returned to the tank through relief valve outlet connections 60 and 60' to the return pipe 37.

The valve 34 in the particular form diagrammatically illustrated in Fig. 8, comprises a stationary valve body formed with a cylindrical piston chamber 65 surrounded by three side by side circumferential grooves 66, 67 and 68, each open at its inner edge to the piston chamber. The valve body is also formed with circular chambers 69 and 70 at its opposite ends which are larger in diameter than the valve chamber 65. The end chambers 69 and 70 are connected by a passage 71 in the portion of the valve body surrounding the piston chamber 65 and associated annular passages 66, 67 and 68. The pipes 30, 31, 35 and 36 are connected to the channels 66, 68, 67 and 71, respectively, through ports formed in the casing or body of the valve 34. The plunger or movable valve member 38 of the valve 34 comprises spaced apart piston portions 72 and 73 working in the valve chamber 65, and a valve stem portion at one end of the piston portions 73 of reduced diameter. Said stem portion is slidingly received in and extends through a passage of corresponding diameter in the valve body. As previously stated the valves 34 and 34' may be alike, and in Fig. 8 the valve 34' is shown as comprising parts 65', 66', 67', 68', 69', 70', 71', 72' and 73', corresponding respectively to the parts 65, 66, 67, 68, 69, 70, 71, 72 and 73 of the valve 34.

In the position of the valve member 38' shown in Fig. 8 in which its stem portion engages the cam disc edge 39'', the pressure fluid passing into the valve through the pipe 35' passes through the channel 67' into the piston chamber 65' through the space between the piston end portions 72' and 73' of the valve 38', and thence through the channel 66' and pipe 30' into the rear end of the cylinder 20'. In this condition of the valve 34', pressure fluid is exhausted from the front end of the cylinder 20' through the pipe 31' which opens into the circumferential channel 68' which is in communication with the channel 70' when the movable valve member is in the position shown in Fig. 8. The channel 70' is at all times in free communication with the transverse channel 71' and thereby is in free communication with the outlet 36' and exhaust pipe 37.

In Fig. 8 the valve stem 38 of the valve 34 is in engagement with the edge 39' of the cam 39, and the right end piston portion 72 of the valve 38 closes communication between the channels 66 and 67, while the left end piston portion 73 of the valve 38 is in such position that the channel 67 is in free communication with the channel 68. In consequence, pressure fluid then passes through the pipe 31 into the front end of the cylinder 20 to effect an idle or return stroke of the lever 19. In this condition of the valve 34, pressure fluid may exhaust from the rear end of the cylinder 20 through the pipe 30, the channel 73, and chamber 69, cross-channel 71, outlet 36 and pipe 37.

As shown in Fig. 8, the valve member may be formed with its piston portions 72 and 73 so shaped and disposed that as the member passes through an intermediate position the channel 67 is in communication with the adjacent channels 66 and 68 and the channels 66 and 68 are in communication with the channels 69 and 70, respectively. The liquid supplied by the supply pipes 35 to the channel 67 then momentarily passes from the latter, partly through the channels 66 and 69 into one end of the channel 71, and partly through the channels 68 and 70 into the other end of the channel 71, and passes from the latter through the outlet 36 into the exhaust pipe 37.

The means employed to pass liquid from which solids are to be separated into the sedimentation space, and for removing from that space the liquid from which solids have been separated are well known and form no part of the present invention and do not need to be illustrated or described herein.

The general operation of the apparatus shown in Figs. 1-8 will be apparent, it is believed, from the diagrammatic showing of the apparatus in Fig. 8 and the foregoing explanations. It may be summarized as follows: The pumps 45 and 45' draw oil or other pressure fluid from the reservoir 50 continuously through the supply pipe 51 and its branches 52 and 52' running to the pump inlets. The volumetric rate at which oil is discharged by each of the pumps 45 and 45' to the inlets of the corresponding pressure relief valves 55 or 55' depends on the speed of the motor 49.

Ordinarily, the motor 49 is of a so-called constant speed type but is adapted to discharge oil at a volumetric rate which increases when the oil delivery pressure becomes low. An increase in the resistance to rotation of the mud rakes 6 results directly in an increase of the motor load and an increase in the pressure of the oil passing from the pump to the pressure relief valves 55 and 55'. When the pressure in the pressure relief valves builds up to a predetermined maximum value, those valves open and return to the reservoir 50, more or less of the pressure fluid which they receive from the pumps.

The stoppage of the motor drive mechanism and the mud rakes may effect a signal actuation, and in any event gives notice to the operator that some adjustment is needed. As those skilled in the art will understand, that adjustment may involve the interruption, or a complete or partial reduction in the passage of liquid to be sedimented in the sedimentation chamber, coupled in some cases with a temporary elevation of the mud rakes to facilitate the removal of the mud accumulated in the lower portion of the sedimentation chamber. As long as the motor drive mechanism remains in operation, the rotation of the shaft 7 operates through the gear wheels 17 and 41 and cam 39 to adjust the valve members 38 and 38' back and forth and thereby cause the pistons 28 and 28' to give the ratchet levers 19 and 19' working strokes, and return strokes alternating with the working strokes.

In the normal operation of the apparatus illustrated, oil is supplied at the same volumetric rates to the two control valves 34 and 34' by the pipes 35 and 35'. While such desirable uniformity in the two oil supply rates may be secured with other arrangements, the two similar positive displacement pumps 45 and 45' with a common driving motor shown herein, form a simple and reliable arrangement for the purpose. The fact that the volumetric oil outputs of the two pumps are practically constant except as they increase somewhat when the pump load is low, contributes to the stability of operation.

Under normal load conditions, the return strokes of the ratchet levers 19 and 19' may be effected with suitable rapidity by oil pressures in the conduit connections 31 and 31' substantially lower than the oil pressures actually existing in those conduit connections. However, the piping and valve arrangement is simplified by supplying oil to each end of the cylinders 20 and 20' from the same high pressure source. Moreover, the fact that the conduit connections 31 and 31' receive oil from the high pressure source makes the operation of the mechanism more positive and better adapted to operate without shock or change in speed as each of the cylinders 20 and 20' picks up the rotative load previously borne by the other.

The taking up of the ratchet pawl back lash immediately prior to the taking up of the rotative load by each cylinder in the initial portions of its working stroke, is expedited by the fact that each of the pumps 45 and 45' delivers oil more rapidly when the back pressure against which the pump works is below normal. The back lash take-up action is also expedited by the arrangement of the pivoted cylinders and ratchet levers as shown, so that the axis of each cylinder is tangential to the circular path of movement of the corresponding pivot 22 or 22' when the corresponding ratchet lever 19 or 19' is in its midstroke position. With this arrangement, the ratio of angular movement of each ratchet lever to the longitudinal movement of the corresponding piston 28 or 28' is appreciably higher in the initial portion than in the main portion of the working stroke of the piston.

With the hydraulic motor drive arrangement shown, a pressure gauge attached to the oil supply piping at any convenient point constitutes a load torque indicator. Thus, for example, each of the gauges 58 and 58' at the respective outlets of the pumps 45 and 45' provides an indication of the driving torque. As will be apparent, my novel hydraulic motor drive is not restricted to use in rotating the mud rake of a sedimentation unit, but is well adapted for a wide variety of other uses in which a body is rotated at a relatively low angular speed against high resistance.

Figure 10:
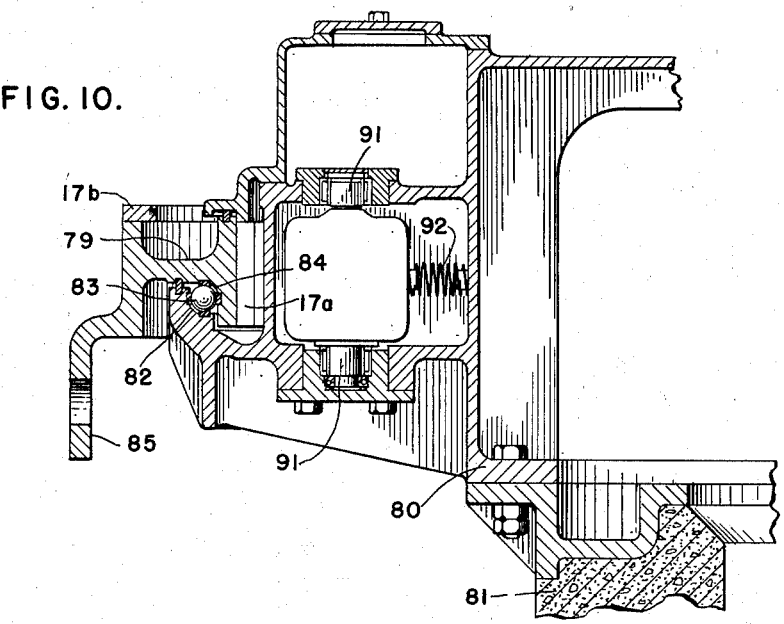
Fig. 10 is a section on the line 10—10 of Fig. 9.
Figure 11:
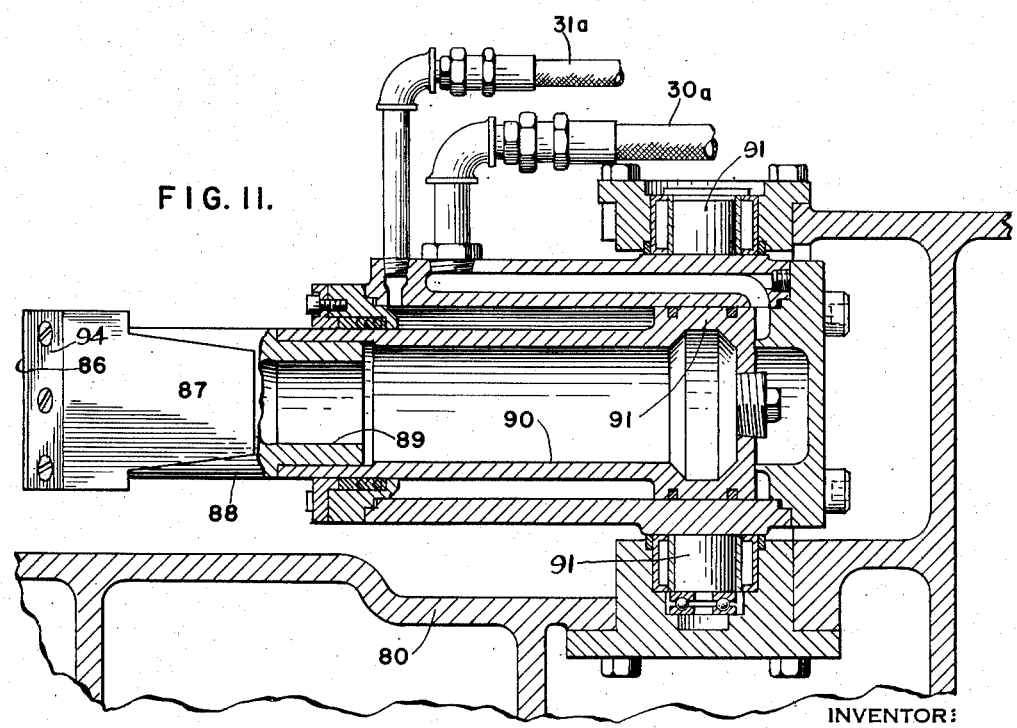
Fig. 11 is a section on the line 11—11 of Fig. 9.

As those skilled in the art will recognize, my improved hydraulic motor drive mechanism may take other forms from that illustrated in Figs. 1-8. Figs. 9, 10 and 11 illustrate a modified form of the drive mechanism employed to rotate the mud rakes of a sedimentation unit in which the mud rake mechanism is mounted on a center pier. The mechanism shown in Figs. 9, 10 and 11 comprise a rotatable annular member 79 commonly called a bull ring or rotatable turn-table member. The member 79 is mounted on a metallic framework 80 secured to the upper end of a center pier 81 customarily in the form of a tubular column of concrete. The framework 80 is formed with a raceway element 82 for anti-friction bearing balls 83 which engage a cooperating raceway element 84 formed in the member 79. The bearing balls 83 and associated raceway form a thrust bearing which also prevents the turn-table element 79 from moving transversely to its axis of rotation. The member 79 is formed with depending bracket portions 85 through which the mud rake elements (not shown) are supported and rotated.

The rotatable turn-table element 79 is formed with internal spur gear teeth 17a of relatively coarse pitch which serve the same ratchet teeth purposes served by the teeth of the wheel 17 of the construction first described. In normal operation, each of the ratchet wheel teeth 17a is successively engaged by each of a plurality, four as shown, of pawls 86. Each pawl 86 is connected to a piston working in a corresponding one of four hydraulic cylinders 20a, 20b, 20c and 20d. As shown, each pawl 86 has a shank 87 anchored in a chuck or bushing 88, and the latter has a tubular tenon portion secured in the outer end of the tubular piston stem or rod 89 formed integrally with the piston 90 working in the corresponding hydraulic cylinder. The four hydraulic cylinders are mounted on the stationary framework 80, and are spaced 90° apart about the common axis of the framework 80 and turn-table element. Each of the hydraulic cylinders is formed with aligned upper and lower vertical trunnion pivots 91 adjacent the rear end of the cylinder and journalled in suitable bearings supported by the stationary framework 80. A spring 92 acting between a stationary abutment 93 carried by the framework 80 and the inner side of each cylinder in front of its trunion pivots, tends to hold each pawl 86, or some portion of its mechanical connection with the corresponding piston 90, in engagement with a tooth 17a at all times.

In the arrangement shown, the pistons working in each pair of diametrically opposed hydraulic cylinders are given their working strokes simultaneously, and are given simultaneous return strokes during periods alternating with those in which they make their working strokes. During the periods in which the pistons working in either pair of diametrically opposed cylinders are making their working strokes, the pistons working in the other pair of cylinders make their return strokes. During each working stroke of each pawl 86, the latter is in engagement with the corresponding tooth 17a of the member 79 while the latter is given an angular movement corresponding to the angular distance between each two adjacent teeth 17a. The supply of oil under pressure to, and the exhaust of oil from the ends of the various cylinders 20a—20d may be controlled in various ways. For example, each of the teeth 17a may successively actuate a control switch mechanism to thereby control the energization of solenoid control valves. As diagrammatically shown in Fig. 9, however, the supply of pressure fluid to, and its exhaust from the four cylinders is regulated by control valves 34a and 34b which may be exactly like the valves 34 and 34' of the construction first described and which are adjusted by an edge cam 39a shaped exactly like the edge cam 39 of the construction first described. As diagrammatically indicated in Fig. 9, the shaft 40a which carries the cam 39a also carries a small gear 41a having its teeth in mesh with those of an internal spur gear 17b carried by the turn-table element 79. The teeth of the gear 41a and the gear 17b are of such pitch that the cam 39 makes one complete rotation for each angular advance movement of the element 79 corresponding to the angular distance between two adjacent teeth 17a.

As diagrammatically shown, the valve 34a has conduit connections 30 and 31 through which oil passes alternately in opposite directions, as it passes through the connections 30 and 31, respectively, of the valve 34 of the construction first described. The conduit connection 30 is connected by a branch pipe 30a to the rear end of the cylinder 20a, and is connected through a branch 30b to the rear end of the cylinder 20b. The conduit connection 31 has a branch 31a connected to the front end of the cylinder 20a, and a branch 31b connected to the front end of the cylinder 20b. The control valve 34b has connections 30' and 31' corresponding to the connections 30' and 31' of the valve 34' of the construction first described. The conduit connection 30' has a branch 30c running to the rear end of the cylinder 20c and another branch 30d running to the rear end of the cylinder 20d. The conduit connection 31' has one branch 31c running to the front end of the cylinder 20c and another branch 30d running to the front end of the cylinder d. The valve 34a receives oil under pressure and exhausts oil through pipes 35a and 36a, respectively. Similarly, the valve 34b is associated with supply and exhaust pipes 35b and 36b, respectively, as the valve 34' is associated with the pipes 35' and 36' in the construction first described. The pipes 35a and 35b include pressure relief valves 55a and 55b, respectively. Similarly, the pipes 31 and 31' of Fig. 9 include pressure relief valves 59a and 59b which serve the purposes of the valves 59 and 59' of the construction first described, and may be similarly connected to the exhaust piping.

The general operation of the apparatus shown in Figs. 9, 10 and 11 is quite similar to that of the apparatus shown in Figs. 1–8. With the control valve arrangement shown in Fig. 9, the pair of cylinders 20a and 20b or the pair of cylinders 20c and 20d can do collectively what is done by either one of the cylinders 20 and 20' of the first construction. With the two cylinders of each pair at opposite sides of the axis of rotation of the structure rotated, the torque producing forces acting on the rotating structure at any one time are in balance, so that they subject the rotating structure to no unbalanced force tending to move the structure transverse to its axis of rotation.

With the valve mechanism shown in Fig. 9, the working strokes of each diametrically opposed pair of cylinders may overlap the working strokes of the other pair, and each of the four cylinders thus contributes to smooth continuous rotation of the rotating structure. The advantage obtained with the arrangement shown in Figs. 1–8 from the fact that each cylinder is supplied with working fluid from a separate source delivering pressure fluid at a substantially constant volumetric rate, is not lost with the arrangement shown in Fig. 9, since the two cylinders simultaneously supplied with oil under pressure by any one of the conduit connections 30a, 31a, 30b, 31b, operate in synchronism and in phase with one another, and under the same load conditions, so that each takes its half of the pressure fluid then being supplied by the conduit connection.

With each pawl 86 in line with, and rigidly connected to the piston working in the corresponding hydraulic cylinder, the mechanism for applying the torque to the turn-table element 79 is very simple and direct. The line of action of each pawl on the element 79, departs from the tangential only to a relatively small amount, so that each cylinder operates on the element 79 with but little less than the maximum possible power. The physical connection of the pipe 30a to the forward end of the cylinder 20a, as is shown in Fig. 11, and the arrangement of the portions of the pipes 30a and 31a adjacent the cylinder makes it possible to substantially minimize the stresses impressed on the flexible portions of the pipes by the oscillating movement of the cylinder 20a relative to its supporting structure 8. The piping to each of the cylinders 20b, 20c and 20d may be like the piping to the cylinder 20a in respect to the relative disposition of the pipes and cylinders shown in Fig. 11. With the pawls 86 and their mechanical connections to the corresponding pistons 90 disposed and arranged as shown, each pawl is in continuous engagement with a single tooth 17a throughout each working stroke, and may be in such substantially continuous engagement with said tooth and the following tooth during the following return stroke as to avoid any significant angular movement of the corresponding hydraulic cylinder about the axis of the pivots 91.

The pawl and pawl supporting surfaces engaging the teeth 17 are subject to only moderate wear and may be made readily replaceable when necessary, or desirable. As shown, each pawl is provided with a removable bumper plate 94 formed of non-metallic material such as a fibre reinforced plastic which lines the portion of the pawl directly alongside of the end of the tooth 17a with which the pawl is in engagement during its working stroke. The use of such non-metallic material cushions the engagement of the pawl with the top of a ratchet tooth.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. A sedimentation unit comprising a sedimentation space and including in combination, a stationary supporting structure, a rotating structure mounted in said supporting structure to rotate about a vertical axis, and including a mud rake in said space, hydraulic motor drive means including a pawl and ratchet mechanism for rotating said rotative structure comprising a ratchet wheel and a plurality of oscillating pawls each adapted to engage said wheel and subject the latter to a rotative force when moving in one direction during each oscillation, a separate hydraulic cylinder and piston longitudinally movable therein associated with each pawl, a mechanical connection between each piston and associated pawl through which said pawl may be moved in a driving direction to rotate said rotative structure when liquid under pressure is supplied to one end of the cylinder containing said piston and may be given a return movement when liquid under pressure is supplied to the other end of that cylinder and arranged to make the working stroke of each pawl overlap a portion of the working stroke of another pawl, and mechanism for passing liquid under a regulated pressure alternately into the opposite ends of each cylinder and for exhausting liquid from each end of each cylinder during periods in which liquid under pressure is passed into the other end of the cylinder, said mechanism comprising a separate adjustable control valve associated with each cylinder and having an inlet, a separate conduit connection between said valve and each end of the associated cylinder, and means operating in timed relation with the rotative movement of said rotative structure for adjusting said valve to alternately connect each of said conduit connections to the inlet of said control valve, and mechanism for continuously supplying liquid under pressure at the same volumetric rates to the different control valves, the last mentioned mechanism including a separate source of liquid under pressure connected to each control valve and passing liquid to the latter at a regulated volumetric rate.

2. A sedimentation unit as specified in claim 1, including a separate pressure relief valve associated with the conduit connection between each control valve and the said other end of the associated cylinder, and operating to prevent the pressure in said connection from exceeding a predetermined maximum, and a separate pressure relief valve through which the separate source of liquid under pressure connected to the last mentioned control valve passes liquid to the latter.

3. A sedimentation unit as specified in claim 1, in which each cylinder is pivotally connected to said supporting structure to oscillate about an axis parallel to the axis of rotation of said rotatable member and in which the mechanical connection between each pawl and the associated piston comprises a ratchet lever pivoted to rotate about said axis of rotation and to which said pawl is pivoted and in which the corresponding piston has a stem rigidly connected at one end to said piston and rigidly connected at its opposite end to said lever.

4. A sedimentation unit as specified in claim 3, in which each cylinder and associated lever and mechanical connection are so formed and arranged that the ratio of angular movement of each lever to the longitudinal movement of the corresponding piston is greater in the initial portion of the working stroke movement of the piston toward said ratchet end of the corresponding cylinder than in the major following portion of said working stroke movement.

5. A sedimentation unit as specified in claim 1, in which the hydraulic cylinders are arranged in pairs with the two cylinders of each pair mounted on said supporting structure at opposite sides of the axis of rotation of the rotating structure, and in which each adjustable control valve is associated with each cylinder of a corresponding pair of said cylinders and supplies pressure fluid alternately to the opposite ends of said cylinders as required to give the pistons working in the two cylinders simultaneous working strokes and simultaneous return strokes.

6. A sedimentation unit comprising in combination, stationary supporting means, a rotatable structure mounted in said supporting means to rotate about a fixed axis and including a series of teeth extending circularly about said axis, a plurality of pawls cooperating with said teeth to form a pawl and ratchet mechanism adapted to rotate said structure about said axis when said pawls are oscillated, a separate hydraulic cylinder associated with each pawl, a reciprocating piston in each of said cylinders, a mechanical connection between each piston and the associated pawl oscillating the latter when said piston is reciprocated, a separate control valve associated with each cylinder and having an inlet for liquid under pressure, an exhaust outlet and a separate conduit connection to each end of the associated cylinder, means adjusting each control valve in timed relation with the rotative movement of said rotating structure to alternately connect its conduit connections to its inlet and to connect each of said conduit connections to said exhaust outlet when the other of said conduit connections is connected to said inlet, a separate pressure relief valve connected to each control valve and having a relief outlet and including means for opening and closing said relief outlet as the pressure in said control valve rises to and falls below a predetermined maximum, and means connected to the inlet of each pressure relief valve and supplying liquid under pressure thereto at a constant volumetric rate.

CHARLES HAROLD SCOTT.

REFERENCES CITED

The following references are of record in the file of this patent:

UNITED STATES PATENTS

| Number | Name | Date |
| --- | --- | --- |
| 497,171 | Dumke | May 9, 1893 |
| 859,961 | Meier | July 16, 1907 |
| 933,637 | Farrell | Sept. 7, 1909 |
| 1,791,013 | Rudolph | Feb. 3, 1931 |
| 1,851,502 | Ferris et al. | Mar. 29, 1932 |
| 1,912,184 | Ferris et al. | May 30, 1933 |
| 2,077,744 | Cuno et al. | Apr. 20, 1937 |
| 2,103,530 | Henry | Dec. 28, 1937 |
| 2,286,387 | Weiss et al. | June 16, 1942 |
| 2,301,122 | Kellett | Nov. 3, 1942 |
| 2,331,790 | Nichols | Oct. 12, 1943 |
| 2,398,178 | Ellison | Apr. 9, 1946 |